United States Patent [19]

Shah et al.

[11] Patent Number: 5,079,462

[45] Date of Patent: Jan. 7, 1992

[54] BRUSHLESS ELECTRICAL POWER GENERATOR WITH REDUCED HARMONICS

[75] Inventors: Mahesh J. Shah; Clarence F. Dolan, both of Rockford; Derek N. Walton, Roscoe, all of Ill.

[73] Assignee: Sundstrand Corporation, Rockford, Ill.

[21] Appl. No.: 485,489

[22] Filed: Feb. 27, 1990

[51] Int. Cl.$^5$ .................................. H02K 11/00
[52] U.S. Cl. ............................ 310/68 D; 336/65
[58] Field of Search ............ 310/68 D, 68 R, 72, 310/159, 68 C; 336/65, 67, 68, 92, 84 C, 84 R, 84 M, 173, 174, 175; 322/27, 32

[56] References Cited

U.S. PATENT DOCUMENTS

| | | | |
|---|---|---|---|
| 1,752,319 | 4/1930 | White | 307/95 |
| 3,577,002 | 5/1971 | Hall | 290/46 |
| 3,858,107 | 12/1974 | Yarrow et al. | 322/26 |
| 3,867,657 | 2/1975 | Yates et al. | 310/68 D |
| 4,321,493 | 3/1982 | Wefel | 310/68 D |
| 4,818,957 | 4/1989 | Cort | 333/12 |
| 4,825,185 | 4/1989 | Matsui | 336/92 |

Primary Examiner—Steven L. Stephan
Assistant Examiner—Judson H. Jones
Attorney, Agent, or Firm—Antonelli, Terry, Stout & Kraus

[57] ABSTRACT

A brushless generator in accordance with the present invention includes a main generator having a stator (12) on which is wound at least one phase winding (52-56), each phase winding producing a phase output ($\Phi A$-$\Phi C$); a number of current transformers (20-24) equal in number to a number of phases present in the main generator, each current transformer being magnetically coupled to a conductor (48) of a different phase winding; and a plurality of annular disks (40), equal in number of the number of phases, each annular disk having an annulus (46) containing the conductor of the phase winding of a different phase, slot (42) extending from an inner radius (44) defining the annulus to an outer radius (50) defining an outer cirucmference of the disk, each annular disk being held by a support (10) for the current transformer, having a permeability greater than 1020-type steel and attenuating harmonics of a fundamental frequency of AC produced by the main generator.

27 Claims, 2 Drawing Sheets

BRUSHLESS ELECTRICAL POWER GENERATOR WITH REDUCED HARMONICS

DESCRIPTION

1. Technical Field

The present invention relates to brushless alternating current power generators having reduced harmonics.

2. Background Art

Electrical power generating systems for airframes utilize three phase main generators for producing 400 Hz. alternating current which are driven by the propulsion engines. Specifications set a level of harmonics which may be present in the fundamental frequency of alternating current produced by airframe power generating systems. Conventionally, filters are coupled to the output phases produced by the main generator to attenuate harmonics below a level set by the specifications governing the level of harmonics which may be present. Filters have the disadvantage that they are heavy and are expensive in that they must be sized to handle the high level of output current produced by a three phase main generator in an airframe power generating system.

Current transformers are used to sense current level flowing in the main power buses at different points in the airframe. Conventionally, a current transformer is connected to each of the output conductors which are part of the phase windings of the main generator for sensing the current flowing from the generator. The level of current flow at the various points in the airframe including the output phases of the main generators which are driven by the propulsion engines are sensed to determine any differential faults which are indicative of a potentially dangerous situation of a short to the airframe fuselage. A current transformer has a secondary wound on a ring with the primary being a conductor of one of the phases passing through the center of the ring.

U.S. Pat. No. 4,321,493, which is assigned to the assignee of the present invention, discloses a current transformer support assembly for use in supporting current transformers on the stator of a main generator in an airframe power generating system as illustrated in FIG. 1. The current transformer support 10 is illustrated in cross-section with respect to the stator 12 of the main generator. The current transformer support 10 has three well-shaped chambers 14, 16 and 18 which respectively contain the secondaries 26-30 of the current transformers 20-24. Each current transformer 20-24 is respectively coupled to an electrical conductor 32-36 which forms the neutral of the phase winding contained within the slots of the stator (not illustrated). The support 10 is the neutral.

In commercial practice of the invention illustrated in FIG. 1, an annular disk 40 manufactured from 1020-type steel is provided in the bottom of each of the well-shaped chambers 14, 16 and 18 to shield the secondaries 26-30 from the magnetic field produced by the stator phase windings (not illustrated) contained within the stator slots 41. The purpose of the magnetic shield, which as described above in practice was manufactured from 1020-type steel, was to shield the secondaries 26-30 of the current transformers 20-24 from the magnetic field produced by high transient currents in the phase windings within the stator. A transient high current flow in the phase windings within the stator could produce a magnetic linkage with the secondaries 26-30 of the current transformers 20-24 which would be interpreted by the system power bus controller (not illustrated) as a differential fault which requires a resetting condition of circuit breakers within the airframe power buses. The annular disks 40, which contain a slot extending from an inner annulus to an outer radius were for the purpose of lessening the aforementioned magnetic linkage to prevent potential differential fault conditions being sensed when in fact the condition present was a transient current flow of a high magnitude within the phase windings of the stator. As a result, a false trip of the circuit breakers would occur which requires resetting which is a nuisance condition at a minimum.

Noise suppressors utilizing magnetizable materials which are connected around a conductor for suppressing noise flowing within the conductor are known. See U.S. Pat. Nos. 4,818,957 and 4,825,185. U.S. Pat. No. 1,752,319 discloses a laminated annular member of magnetizable material containing an air gap for reducing currents flowing in the sheath covering a cable.

DISCLOSURE OF INVENTION

The present invention is a brushless generator providing reduced harmonics and a method of attenuating harmonics within a range between a seventeenth and a sixtieth harmonic of a fundamental frequency of AC produced by a brushless airframe generator. The invention is based upon the discovery that in practice the electromagnetic shields 40 of the prior art, which in commercial airframe generators in accordance with U.S. Pat. No. 4,321,493 utilized 1020-type steel, attenuated harmonics at least within the seventeenth and sixtieth harmonic of the fundamental frequency of alternating current produced by an airframe generator. This discovery was made by the inventors in comparing the harmonics produced by an airframe generator having the aforementioned electromagnetic shields 40 to the harmonics produced by an airframe generator without the aforementioned electromagnetic shields during research directed to reducing electrical noise produced by airframe generators. Once the discovery was made that the aforementioned electromagnetic shields reduced noise, it has been theorized that they function as an inductance which is coupled to the three phase outputs produced by the airframe generator. Since inductance is a function of the permeability of a material, the present invention provides increased reduction of harmonics at least within the range of the seventeenth to sixtieth harmonic by utilizing an annular disk having an annulus containing a conductor of a phase winding of a generator having a slot extending from an inner radius defining the annulus to an outer radius defining an outer circumference of the annulus having a permeability ($\mu$) greater than 1020-type steel. Preferably, each annular disk is mounted as in the prior art illustrated in FIG. 1 as part of a current transformer support which includes the slotted annular disk which also functions as an electromagnetic shield to decouple any high magnetic fields produced by current transients in the phase windings within the slots of the stator from the secondaries of current transformers contained within the current transformer support mounted on the outside of the stator of the main generator to prevent potential false indications of differential faults by the current transformers contained within the current transformer support which are a nuisance condition as discussed above. Preferably, the permeability of the annular disks should be as high as possible with materials such as cobalt steel or nickel steel being utilized. The annular disks of the present invention having a permeability greater than 1020 steel provide dual advantages of attenuating harmonics at least within the range of the seventeenth to sixtieth harmonics and further providing magnetic shielding between the phase windings within the slots of the stator and the current transformers while eliminating the need for external filtering having the aforementioned weight, size and expense disadvantages to eliminate harmonics between the seventeenth and sixtieth.

A brushless generator in accordance with the present invention includes a main generator having a stator on which is wound at least one phase winding with each phase winding producing a phase output voltage; a number of current transformers equal in number to a number of phases present in the main generator, each current transformer being magnetically coupled to a conductor of a different phase winding; and a plurality of annular disks, equal in number to the number of phases, each annular disk having an annulus containing the conductor of a phase winding of a different phase, a slot extending from an inner radius defining the annulus to an outer radius defining an outer circumference of the annulus, each annular disk being contained within a support for the current transformer, having a permeability greater than 1020-type steel and attenuating harmonics of a fundamental frequency of AC produced by the main generator. The permeability of the annular disks is greater than 1300. Each annular disk adds inductance in series with each phase winding to attenuate frequency components in the phase output above a fundamental frequency including harmonics within a range between the seventeenth and sixtieth harmonics and provides a magnetic shield between the current transformer and at least one phase winding within slots of the main generator. The inductance of each disk increases in proportion to a thickness of the annular disk parallel to an axis of the annulus of the disk and increases inversely in proportion to a width of the slot measured perpendicular to a radius of the disk passing longitudinally along the slot. The support is mounted at a point of forming a neutral for the phase windings and the main generator has three phases and is a generator for generating electrical power in an airframe. Each annular disk is manufactured from a material having a high permeability such as cobalt or nickel steel.

A current transformer assembly for use in sensing a magnitude of current produced by a phase winding of a brushless generator in accordance with the invention includes a secondary winding for producing an output proportional to current flowing in the phase winding which is magnetically coupled to the phase winding; and an annular disk having an annulus for containing a conductor of the phase winding, the annular disk being contained within a support for the transformer and having a permeability greater than 1020-type steel. The permeability of the annular disk is greater than 1300, the permeability of the annular disk should be as high as possible and may be manufactured from nickel or cobalt steel.

A method of attenuating harmonics within a range between a seventeenth and sixtieth harmonic of a fundamental frequency of alternating current produced by a brushless airframe generator in accordance with the invention includes mounting on a stator of the generator an annular disk having a slot extending from an inner radius defining an annulus to an outer radius defining an outer circumference of the annulus having a permeability greater than 1020-type steel with a conductor of a phase winding producing an output phase of the generator being within the annulus; and producing the fundamental frequency of alternating current while attenuating harmonics within the range. The annular disk is held by a support of a current transformer which senses current flow in the output phase. The disk has a permeability greater than 1300. The annular disk is mounted between a current transformer which is magnetically coupled to the conductor of the phase winding and at least one stator slot containing windings of the phase for also providing a magnetic shield between phase windings within a slot of the stator and the current transformer.

BEST MODE FOR CARRYING OUT THE INVENTION

Figure 1:
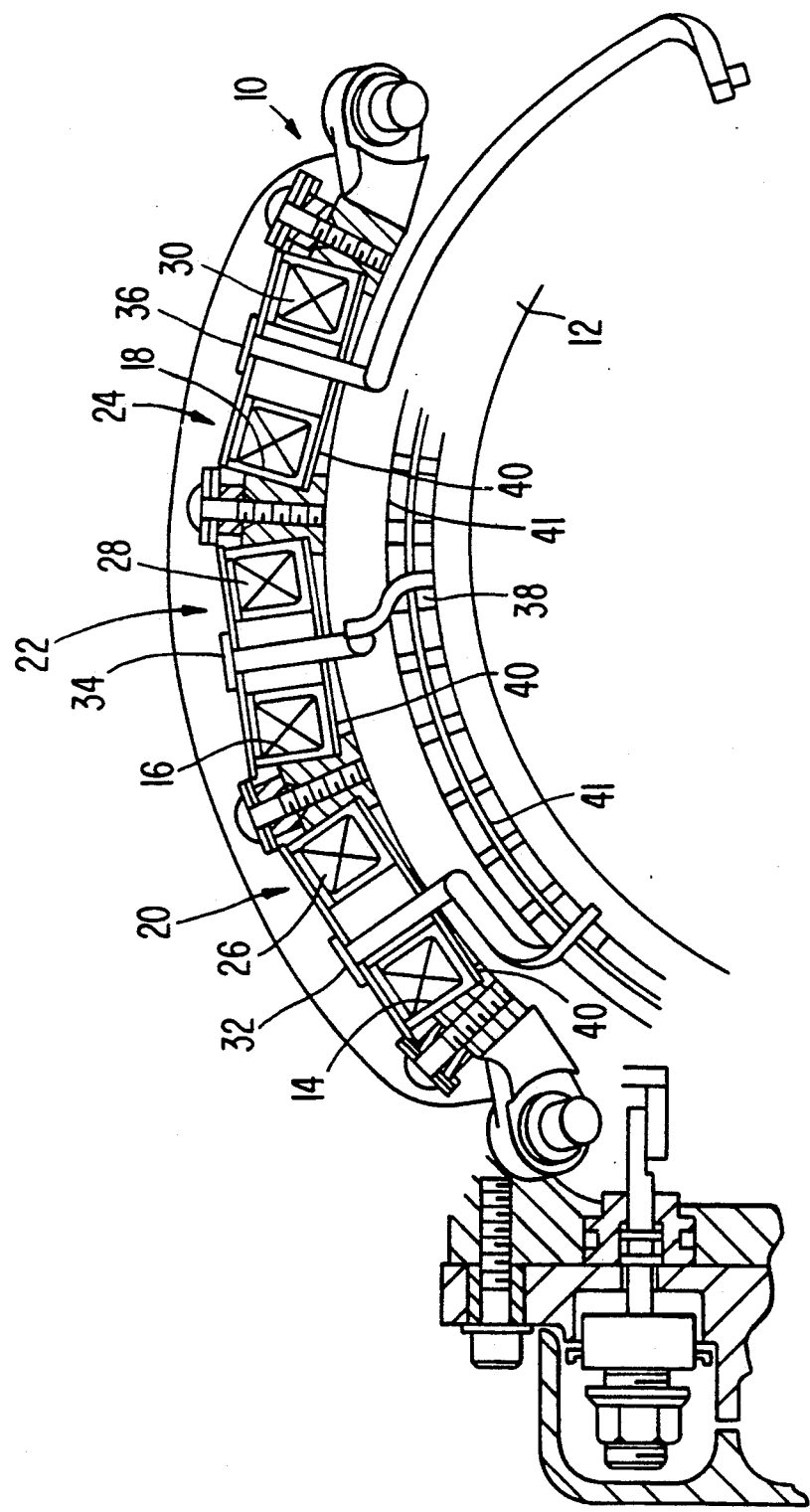
FIG. 1 illustrates a prior art main generator in an airframe electrical power generating system of the type manufactured by the assignee of the present invention.
Figure 2:
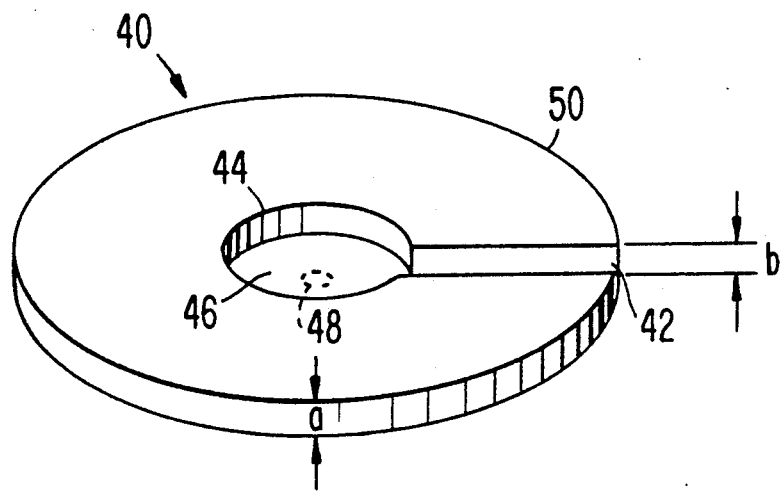
FIG. 2 illustrates an annular disk utilized in an airframe electrical power generating system in accordance with the present invention.

The present invention is a brushless generator and a method of attenuating harmonics within a range between at least a seventeenth and sixtieth harmonic of a fundamental frequency of AC produced by a brushless generator. The present invention is used in a main generator as illustrated in FIG. 1 of the prior art to perform the same function as the element 40 and to provide increased attenuation of harmonics at least within a range of the seventeenth to sixtieth harmonics of the fundamental frequency of AC produced by the main generator which in an airframe application is 400 Hz. FIG. 2 illustrates the individual annular disks 40 which are utilized in the same manner as in the current transformer support 10 of the prior art. Each disk 40 is manufactured from a material having a permeability greater than that of 1020-type steel as used in the prior art for the purpose of increasing the attenuation of harmonics which were discovered during the aforementioned research of the causes of electrical noise produced by main generators in airframe electrical power generating systems. Type 1020 steel has a permeability of 1240. Preferably, the permeability should be much higher than the permeability of 1020-type steel for the reason that the higher the permeability, the greater the inductance added by the annular disk which enhances attenuation of harmonics without adding undesired weight and expense of filters which require high power ratings. Materials such as nickel steel having a permeability of 60,000 and cobalt steel having a permeability of 7,000 are preferable for the reason that their increased permeability adds additional inductance to the outputs of the individual phases and further functions as a magnetic shield to lessen magnetic coupling of the phase windings within the slots of the stator and the secondary of the current transformers which are held in the transformer support 10 as in the prior art. A slot 42 is provided in the annular disk 40 to prevent electrical conduction within the disks to avoid electrical losses. The slot has a width of "b". The slot extends from an inner radius 44 defining an annulus 46 in which a conductor 48, which is illustrated in phantom, is disposed. The conductor 48 is part of a phase winding to which the annular disk adds inductance and which is magnetically coupled to the secondary of a current transformer as illustrated in FIG. 1. The slot extends to an outer radius 50 which is the outer circumference of the disk. The inductance of each disk increases in proportion to a thickness identified by "a" parallel to an axis of the annulus and increases inversely in proportion to a width "b" measured perpendicular to a radius of the disk passing longitudinally along the slot. Additionally, the volume of the material from which the disk 40 is manufactured may be varied to change the overall inductance added to each phase winding.

Figure 3:
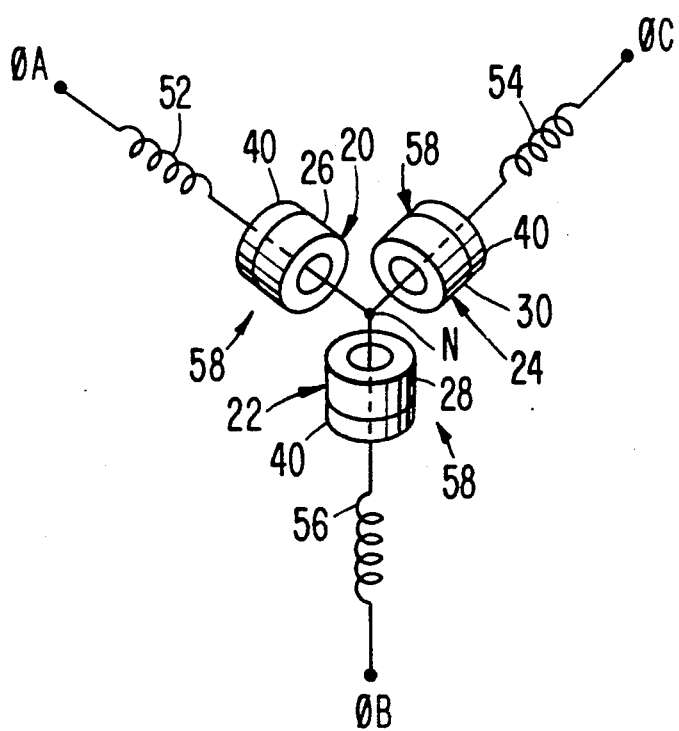
FIG. 3 is an electrical schematic of the main generator in accordance with the present invention in an airframe electrical power generating system.

FIG. 3 illustrates schematically the phase outputs ΦA-ΦC produced by the phase windings 52-56 which are disposed within the slots illustrated in FIG. 1 of the stator. The junction point of the individual conductors of the phase windings 52-56 forms a neutral which is the current transformer support 10 illustrated in FIG. 1. An assembly 58 is comprised of an annular disk 40 and one of the secondaries 26-30 of the current transformers 20-24. In operation, each assembly 58 is contained within one of the wells 14-18 of a main generator in accordance with FIG. 1.

While the invention has been described in terms of its preferred embodiment, it should be understood that numerous modifications may be made thereto without departing from the spirit and scope of the invention as defined in the appended claims. It is intended that all such modifications fall within the scope of the appended claims.

We claim:
1. A brushless generator comprising:
   a main generator having a stator on which is wound at least one phase winding, each phase winding producing a phase output;
   a number of current transformers equal in number to a number of phases present in the main generator, each current transformer being magnetically coupled to a conductor of a different phase winding; and
   a plurality of annular disks, equal in number to the number of phases, each annular disk having an annulus containing the conductor of a phase winding of a different phase, a slot extending from an inner radius defining the annulus to an outer radius defining an outer circumference of the disk, each annular disk being held by a support for the current transformer, having a permeability greater than 1020-type steel and attenuating harmonics of a fundamental frequency of AC produced by the main generator.

2. A brushless generator in accordance with claim 1 wherein:
   the permeability of the annular disks is greater than 1300.

3. A brushless generator in accordance with claim 1 wherein:
   each annular disk adds inductance in series with each phase winding to attenuate frequency components in the phase output voltage above a fundamental frequency including harmonics within a range between the seventeenth and sixtieth harmonics and provides a magnetic shield between the current transformer and at least one phase winding within slots of the main generator.

4. A brushless generator in accordance with claim 3 wherein:
   the inductance of each disk increases in proportion to a thickness of the disk parallel to an axis of the annulus of the disk and increases inversely in proportion to a width of the slot measured perpendicular to a radius of the disk passing longitudinally along the slot.

5. A brushless generator in accordance with claim 2 wherein:
   each annular disk adds inductance in series with each phase winding to attenuate frequency components in the phase output voltage above a fundamental frequency including harmonics within a range between the seventeenth and sixtieth harmonics and provides a magnetic shield between the current transformer and at least one phase winding within slots of the main generator.

6. A brushless generator in accordance with claim 5 wherein:
   the inductance of each disk increases in proportion to a thickness of the disk parallel to an axis of the annulus of the disk and increases inversely in proportion to a width of the slot measured perpendicular to a radius of the disk passing longitudinally along the slot.

7. A brushless generator in accordance with claim 1 wherein:
   the support is mounted at a point of forming a neutral from the phase windings; and
   the main generator has three phases and is a generator for generating electrical power in an airframe.

8. A brushless generator in accordance with claim 2 wherein:
   the support is mounted at a point of forming a neutral from the phase windings; and
   the main generator has three phases and is a generator for generating electrical power in an airframe.

9. A brushless generator in accordance with claim 3 wherein:
   the support is mounted at a point of forming a neutral from the phase windings; and
   the main generator has three phases and is a generator for generating electrical power in an airframe.

10. A brushless generator in accordance with claim 4 wherein:
    the support is mounted at a point of forming a neutral from the phase windings; and
    the main generator has three phases and is a generator for generating electrical power in an airframe.

11. A brushless generator in accordance with claim 5 wherein:
    the support is mounted at a point of forming a neutral from the phase windings; and
    the main generator has three phases and is a generator for generating electrical power in an airframe.

12. A brushless generator in accordance with claim 6 wherein:
    the support is mounted at a point of forming a neutral from the phase windings; and
    the main generator has three phases and is a generator for generating electrical power in an airframe.

13. A brushless generator in accordance with claim 1 wherein:
    each annular disk is manufactured from cobalt steel.

14. A brushless generator in accordance with claim 1 wherein:
    each annular disk is manufactured from nickel steel.

15. A current transformer assembly for use in sensing a magnitude of current produced by a phase winding of a brushless generator comprising:
- a secondary winding for producing an output proportional to current flowing in the phase winding which is magnetically coupled to the phase winding; and
- an annular disk having an annulus for containing a conductor of the phase winding, the annular disk being held by a support for the current transformer and having a permeability greater than 1020-type steel.

16. A current transformer in accordance with claim 1 wherein:
- the permeability of the annular disk is greater than 1300.

17. A current transformer in accordance with claim 15 wherein:
- each annular disk adds inductance in series with each phase winding to attenuate frequency components in the phase output above a fundamental frequency including harmonics within a range between the seventeenth and sixtieth harmonics and provides a magnetic shield between the current transformer and at least one phase winding within slots of the main generator.

18. A brushless generator in accordance with claim 17 wherein:
- the inductance of each disk increases in proportion to a thickness of the disk parallel to an axis of the annulus of the disk and increases inversely in proportion to a width of the slot measured perpendicular to a radius of the disk passing longitudinally along the slot.

19. A brushless generator in accordance with claim 15 wherein:
- each annular disk has a slot extending from an inner radius defining the annulus to an outer radius defining a outer circumference of the annulus.

20. A brushless generator in accordance with claim 17 wherein:
- the inductance of each disk increases in proportion to a thickness of the disk parallel to an axis of the annulus of the disk and increases inversely in proportion to a width of the slot measured perpendicular to a radius of the disk passing longitudinally along the slot.

21. A brushless generator in accordance with claim 16 wherein:
- the annular disks are manufactured from a material having a permeability greater than 2000.

22. A brushless generator in accordance with claim 16 wherein:
- the annular disks are manufactured from cobalt steel.

23. A brushless generator in accordance with claim 16 wherein:
- the annular disks are manufactured from nickel steel.

24. A method of attenuating harmonics within a range between a seventeenth and sixtieth harmonics of a fundamental frequency of alternating current produced by a brushless airframe generator comprising:
- mounting on a stator of the generator an annular disk having a slot extending from an inner radius defining an annulus to an outer radius defining an outer circumference of the annulus having a permeability greater than 1020-type steel with a conductor of a phase winding producing an output phase of the generator being within the annulus; and
- producing the fundamental of frequency alternating current while attenuating harmonics within the range.

25. A method in accordance with claim 24 wherein:
- the annular disk is held by a support of a current transformer which senses current flow in the output phase.

26. A method in accordance with claim 25 wherein: the disk has a permeability greater than 1300.

27. A method in accordance with claim 24 wherein:
- the annular disk is mounted between a current transformer which is magnetically coupled to the conductor of the phase winding and at least one stator slot containing windings of the phase for also providing a magnetic shield between phase windings within a slot of the stator and the current transformer.

* * * * *